United States Patent [19]

Bailey et al.

[11] Patent Number: 5,318,402

[45] Date of Patent: Jun. 7, 1994

[54] COMPRESSOR LINER SPACING DEVICE

[75] Inventors: Mark J. Bailey, Cincinnati; Kurt J. Bonner, Maineville, both of Ohio

[73] Assignee: General Electric Company, Cincinnati, Ohio

[21] Appl. No.: 948,060

[22] Filed: Sep. 21, 1992

[51] Int. Cl.⁵ .................... F01D 9/04; F01D 11/08
[52] U.S. Cl. .......................... 415/139; 415/173.1
[58] Field of Search ............ 415/134, 138, 139, 170.1, 415/173.1, 173.2, 173.3

[56] References Cited

U.S. PATENT DOCUMENTS

| | | |
|---|---|---|
| 2,858,673 | 11/1958 | Wirt . |
| 4,395,195 | 7/1983 | DeCosmo et al. ............ 415/138 |
| 4,414,816 | 11/1983 | Craig et al. . |
| 4,551,064 | 11/1985 | Park ........................ 415/173.1 |
| 4,614,082 | 9/1986 | Sterman et al. . |
| 4,773,227 | 9/1988 | Chabis . |
| 4,848,089 | 7/1989 | Cramer . |
| 4,944,151 | 7/1990 | Hovnanian . |
| 5,067,324 | 11/1991 | Beytes et al. . |
| 5,079,915 | 1/1992 | Veau . |
| 5,088,888 | 2/1992 | Bobo ....................... 415/170.1 |

FOREIGN PATENT DOCUMENTS 1426857  12/1968  Fed. Rep. of Germany ... 415/173.2

Primary Examiner—Edward K. Look
Assistant Examiner—Christopher M. Verdier
Attorney, Agent, or Firm—Jerome C. Squillaro

[57] ABSTRACT

A spacer band for maintaining uniform spacing between adjacent compressor liner segments comprising two segments having a plurality of locking fingers extending from the band for engaging the casing at both ends of the liner segments and in the middle of the segments. The spacer band is located in a vertical channel located along an edge of each liner segment. The vertical channel is defined by a plurality of vertical flanges and a horizontal flange located on the edge of each liner segment. The horizontal flange has notches for receiving said locking fingers.

7 Claims, 3 Drawing Sheets

COMPRESSOR LINER SPACING DEVICE

BACKGROUND OF THE INVENTION

The present invention generally relates to gas turbine engines and more particularly, to the maintenance of compressor liner segment spacing.

A typical aircraft gas turbine engine includes a compressor for pressurizing air which subsequently is mixed with fuel and ignited in the combuster section with the resulting combustion gases powering the turbine. The compressor and turbine are surrounded by casings or liners through which air is either extracted or distributed.

In a typical compressor, an inner casing or liner is concentric with an outer casing and mounts stator or variable vanes. The inner liner also surrounds the rotor blades of the compressor.

The inner compressor liner is formed in segments around the circumference of the compressor. Because the liner is segmented, it allows recirculation leakage in between the segments which in turn reduces compressor performance. In order to reduce this leakage, spline seals are added between the liner segments.

Gaps between the liner segments wherein the spline seals are located are determined by the thermal expansion of the liner segments, and can be as large as approximately 0.05 inches. Because the gaps between the liner segments are required to be large to compensate for thermal closedown of the liner segments, keeping the spline seals engaged between the liner segments and functioning properly has become problematic. In order to solve the problem of maintaining the spline seals in between the liner segments, radial bolts have previously been used to fasten the liner segments to the outer casing to maintain uniform spacing between the liners. However, radial bolts require reinforcement on the outer casing and also on the liners to maintain the structural integrity of the compressor. This additional reinforcement adds weight and complexity to the design, as well as making it more difficult for assembly and disassembly. Therefore, a need exists for an improved method of maintaining uniform spacing between compressor liner segments that eliminates the problems associated with radial bolts, that is inexpensive to manufacture and easy to install.

SUMMARY OF THE INVENTION

The present invention is a device for maintaining uniform spacing between compressor liner segments which eliminates the need for reinforcement on the casings and liners, thereby reducing the weight and complexity of the overall compressor design. The invention comprises a band, the band is not a full 360°, but, in fact, is two semi-circular pieces, each having approximately a 150° arc length, placed within a vertical channel along an edge of each liner segment. The spacer band includes locking fingers extending from the spacer band into slots formed in the ends and in the middle of each compressor liner segment. Less weight and complexity is associated with the compressor casing by substituting the spacer band for bolts and reinforcement hardware.

Accordingly, it is an object of the present invention to provide a spacer band for compressor liner segments which maintains the segments in a circumferentially spaced, uniform relationship during operation of the engine; a spacer band that is light weight and does not require reinforcement on the casings and liners; and a spacer band that is easy to manufacture and install.

These and other features and advantages of the present invention will be better understood by reference to the following detailed description, the accompanying drawings and the appended claims.

DETAILED DESCRIPTION

Figure 1:
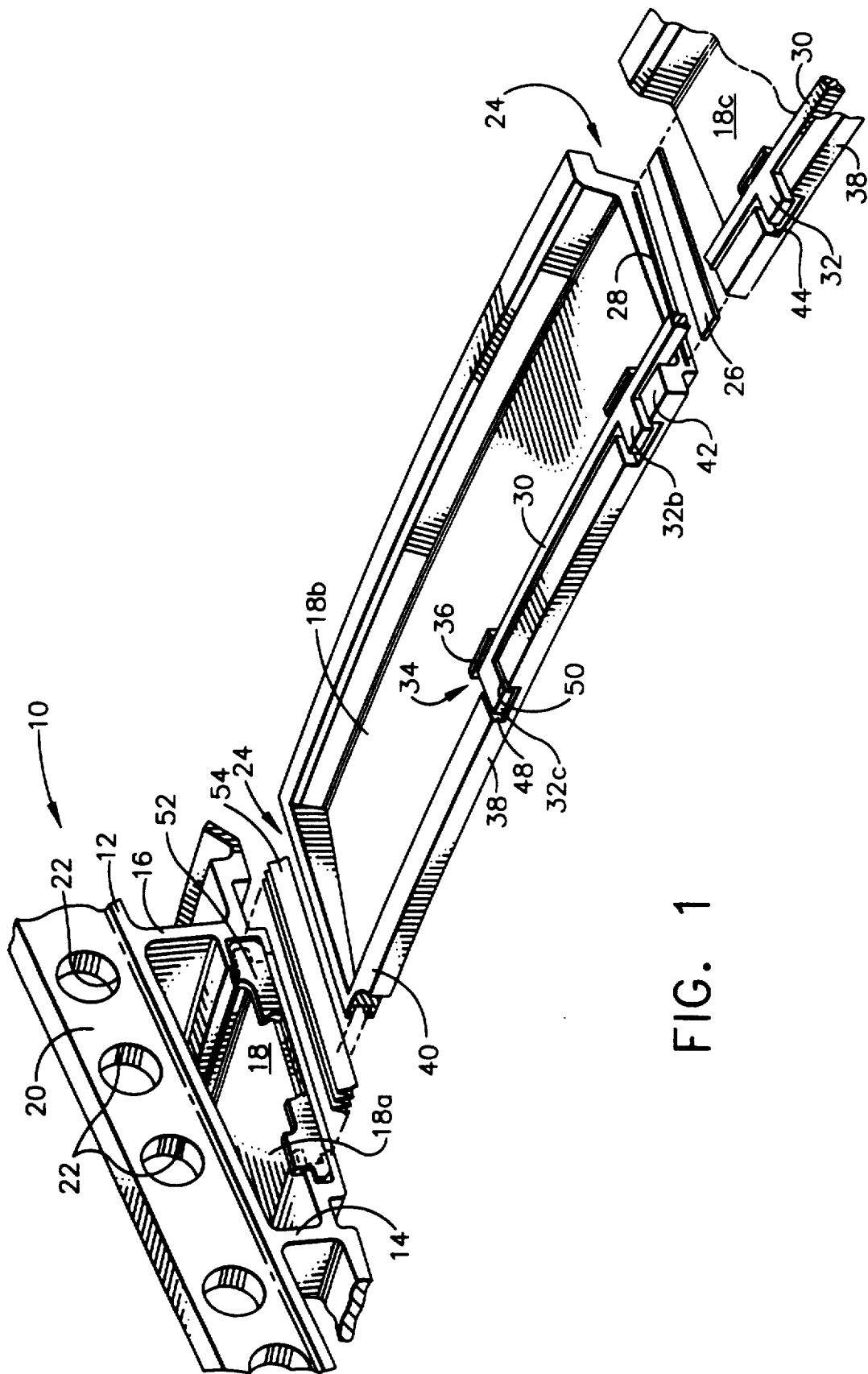
FIG. 1 is a partial perspective, partially exploded view of compressor stage 3 of a jet engine at the horizontal split flange line incorporating the present invention.
Figure 2:
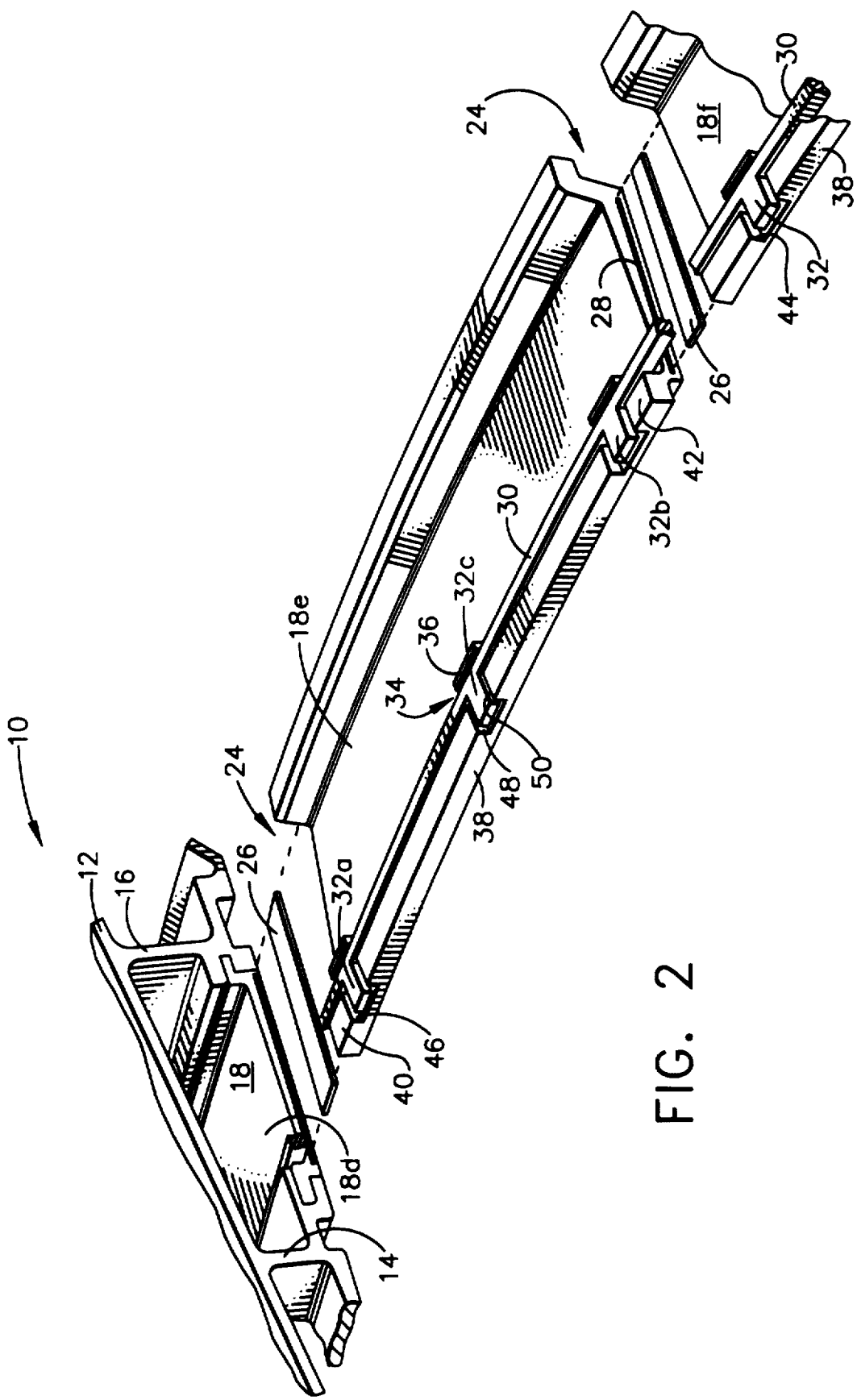
FIG. 2 is a partial perspective, exploded view of compressor stage 3 away from the split flange line incorporating the invention.

The compressor generally designated 10, shown in partial section in FIGS. 1 and 2, includes an outer casing 12 which includes side walls 14 and 16 which extend radially inwardly toward a compressor liner 18. The outer casing 12 extends circumferentially around the compressor 10 and is formed in half sections and has a flange 20 at the ends of each section for securing the casing sections together. The outer casing flange 20 includes a plurality of bolt holes 22 for bolting the casing sections together.

Compressor liner 18 is comprised of circumferentially extending segments of which segments 18a-f are shown. During operation of the compressor 10, heat is generated within the compressor which leads to thermal expansion of the liner segments 18a-f. Because the liner segments thermally expand at a greater rate and magnitude than the casing 12 that contains them, gaps 24 are provided between the liner segments 18a-f, which allow the segments to move and which can be as large as approximately 0.05 inches. Gaps 24 unfortunately allow unwanted recirculation leakage of compressor air to pass between the compressor liner segments 18a-f and the outer casing 12.

To prevent recirculation leakage, spline seals 26 are placed between the liner segments. Spline seal 26 fits into slots 28 formed in the ends of each liner segment. In order for the spline seals 26 to stay engaged between the liner segments 18a-f and function properly, a spacer band 30 is attached to the liner segments 18a-f. The spacer band 30 comprises two semicircular pieces each having approximately a 150° arc length. The spacer band includes a plurality of locking fingers 32 uniformly spaced around the perimeter of the spacer band such that the locking fingers engage the liner segments 18a-f at the ends of each segment as well as in the middle of each segment except for segments 18a and 18b adjacent the split flange 20 wherein the fingers only engage the middle and one end of the segment.

The spacer band 30 fits within a vertical channel 34 formed in each liner segment by a plurality of vertical flanges 36 spaced axially aft from a horizontal flange 38. The spacer band 30 is positioned in each liner segment 18a-f circumferentially by a plurality of locking fingers 32. The locking fingers are uniformly located around the spacer band 30 such that, for example in FIG. 2, locking finger 32a is located near end 40 of liner segment 18e and locking finger 32b is located near end 42 of liner segment 18e. Locking finger 32c is located in the middle of liner segment 18e. Locking finger 32c positions the spacer band 30 by extending into a corresponding notch 50 cut into horizontal flange 38. Locking finger 32c is formed so that a loose fit 48 exists between locking finger 32c and notch 50. Locking finger 32c spaces the liner segments to uniformly maintain the position of the spline seals. A sufficient loose fit would be in the range from about 0.004 to about 0.01 inches.

Locking fingers 32a and 32b are sized so that a gap clearance 46 exists at ends 40, 42 of each liner segment. Gap clearance 46 is sufficiently large to compensate for the difference in thermal growth between the liner segments and the spacer band 30 and prevent binding of fingers 32a and 32b in the notches. Sufficient gap clearance 46 would be in the range from about 0.02 inches to about 0.1 inches.

Figure 3:
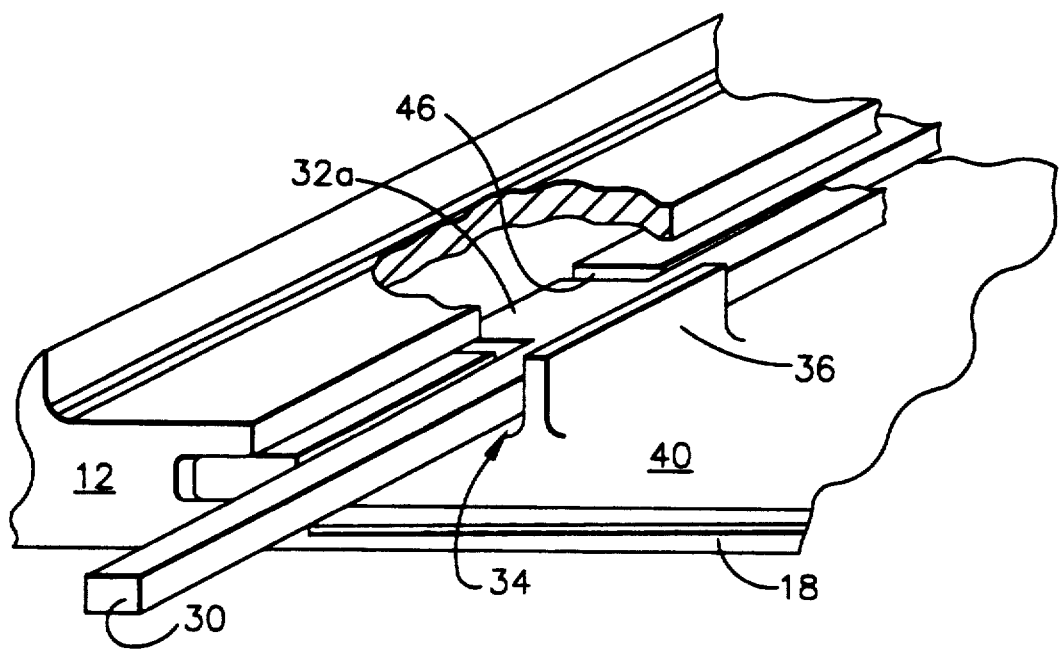
FIG. 3 is a detail of FIG. 2 illustrating the compressor casing overlapping the spacer band.

Referring to FIG. 3, locking fingers 32a and 32b (not shown) prevent the spacer band 30 from falling out of position radially and prevent buckling of the band when the liner segments load up the band tangentially during blade rubs. Once the segments and spacer band are installed into the casing 12, the casing overlaps the fingers and keeps the spacer ring from rising out of the channel 34.

Figure 4:
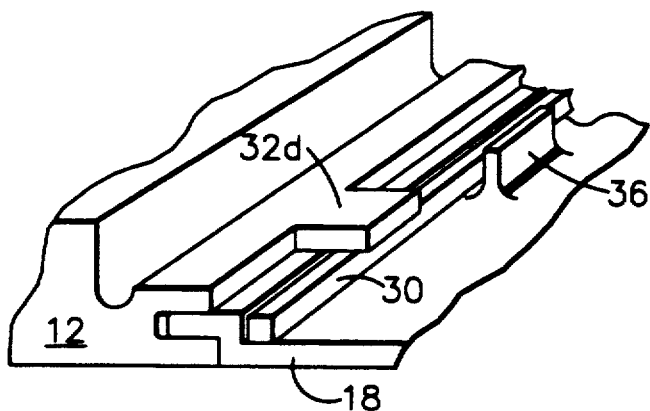
FIG. 4 is an alternative embodiment of the illustration of FIG. 3.

An alternate method for retaining the spacer band 30 radially and preventing buckling is shown in FIG. 4. A locking finger 32d has been placed on the casing 12 instead of having locking fingers on the ends of the spacer band 30. It should be noted that spacer band 30 would still require a locking finger to engage segment 18 in the middle to position the segments.

To prevent circumferential rotation of the liner segments an anti-rotation key 52 (FIG. 1) is brazed to the liner segments 18a and 18b at the horizontal split line wherein the outer casing flanges 20 are bolted together. Circumferential rotation of the compressor liner segments 18a-f can be caused by vibration of the engine or by rubbing of rotor blades (not shown) on the liner segments. An axial compression Enseal 54 is placed between the anti-rotation key 52 and the compressor liner segments 18a and 18b for sealing across the split flange line.

The preceding description has been presented with reference to a presently preferred embodiment to the invention shown in the drawings and specifically for stages 3 and 4 of a jet engine compressor. Workers skilled in the art and technology to which this invention pertains will appreciate that alterations and changes in the described structure can be practiced without departing from the spirit, principles and scope of this invention.

What is claimed is:

1. For use in a gas turbine engine having a plurality of circumferentially adjacent compressor liner segments and a spline seal positioned between adjacent ones of said liner segments, a device for maintaining uniform circumferential spacing of said liner segments comprising:

each of said segments having a vertical channel extending along an edge thereof, said channel being defined by a plurality of vertically-extending flanges and a horizontally-extending flange, said horizontally-extending flange including notches located at the ends and in the middle of an associated one of said segments; and a band positioned within said channels and having a plurality of locking fingers extending from said band for engaging said liner segments at said notches, whereby said spline seals are locked in position to seal said segments.

2. The device of claim 1 wherein a locking finger is located in each notch.

3. The device of claim 2 wherein a gap clearance exists between said locking finger and said notch located at the end of said liner segment.

4. The device of claim 3 wherein said gap clearance ranges from about 0.02 to 0.1 inches.

5. The device of claim 2 wherein a clearance exists between said locking finger and said notch located in the middle of said liner segment.

6. The device of claim 5 wherein said clearance ranges from about 0.004 to 0.01 inches.

7. A device for preventing recirculation leakage between adjacent compressor liner segments comprising:

first and second liner segments each having a vertical channel located along an edge of the segment defined by a plurality of vertical flanges and a horizontal flange, said first and second liner segments further having notches located in the horizontal flange;

a spline seal located between said first and second liner segments; and a spacer band located in said vertical channel having locking fingers extending into said notches.

* * * * *